United States Patent [19]
Urababa et al.

[11] Patent Number: 6,070,954
[45] Date of Patent: Jun. 6, 2000

[54] BRAKE CONTROL SYSTEM FOR AN ELECTRICALLY OPERATED VEHICLE

[75] Inventors: Shingo Urababa; Harumi Ohori; Tetsuya Kuno; Tadashi Terazawa, all of Toyota, Japan

[73] Assignee: Aisin Seiki Kabushiki Kaisha, Kariya, Japan

[21] Appl. No.: 09/141,258

[22] Filed: Aug. 27, 1998

[30] Foreign Application Priority Data

Aug. 27, 1997 [JP] Japan ................................. 9-231600

[51] Int. Cl.$^7$ ................................ B60T 8/58; B60L 7/10; B60L 7/22

[52] U.S. Cl. ........................ 303/152; 303/3; 303/113.5; 303/119.1; 303/116.1; 303/DIG. 3; 303/112; 188/181 T; 188/156

[58] Field of Search ..................... 303/152, 113.5, 303/119.1, 116.1, 9.71, 155, 3, DIG. 3, DIG. 4, 112, 89; 180/65.1–65.8, 165; 188/156, 158, 181 T, 353, 265; 701/22

[56] References Cited

U.S. PATENT DOCUMENTS 5,882,093  3/1999  Enomoto et al. ..................... 303/152

FOREIGN PATENT DOCUMENTS 7-336806  12/1995  Japan .

*Primary Examiner*—Douglas C. Butler
*Attorney, Agent, or Firm*—Burns, Doane, Swecker & Mathis, LLP

[57] ABSTRACT

In an electrically operated vehicle in which a regenerative braking operation is performed to apply a regenerative braking torque to a wheel, if the regenerative braking torque reaches its maximum value and is insufficient to brake the wheel, a static hydraulic pressure outputted from a master cylinder is supplied to the wheel brake cylinder mounted on the wheel until the brake pedal reaches a retained position. Thereafter, a dynamic hydraulic pressure is supplied to the wheel brake cylinder. While the brake pedal is in movement from the rest position to the retained position, the wheel brake cylinder is supplied with only the static hydraulic pressure and while the brake pedal is being retained at the retained position the wheel brake cylinder is supplied with the static hydraulic pressure and the dynamic hydraulic pressure.

15 Claims, 5 Drawing Sheets

(a)

(b)

BRAKE CONTROL SYSTEM FOR AN ELECTRICALLY OPERATED VEHICLE

This application corresponds to and claims priority under 35 U.S.C. §119 with respect to Japanese Application No. 09(1997)-231600 filed on Aug. 27, 1998, the entire content of which is incorporated herein by reference.

FIELD OF THE INVENTION

The present invention generally relates to vehicle brake control systems. More particularly, the present invention pertains to a brake control system for an electrically operated vehicle that performs a regenerative braking operation and a hydraulic braking operation.

BACKGROUND OF THE INVENTION

In an electrically operated vehicle in which the power source for the vehicle is in the form of a battery powered electric motor, it is expected that the electric motor will be used as a generator for performing a regenerative braking operation to recover energy and charge the battery and use the energy for driving the motor. Because the braking force applied to the vehicle wheels through the regenerative braking operation is limited or insufficient to effect full braking, the insufficient braking force is compensated for by adding a hydraulic braking operation. Thus, it is known to perform the regenerative braking operation in combination with the hydraulic braking operation as disclosed in Japanese Unexamined Patent Publication No. Hei7-336806 published on Dec. 22, 1995.

In this brake control system, the braking operation is initiated upon depression of the brake pedal that is associated with a master cylinder. If the regenerative braking operation is set to be performed with top priority, the wheel of the electrically operated vehicle is applied with the summation of the regenerative braking torque and the wheel brake cylinder pressure from an electric motor and the wheel brake master cylinder, respectively. Under such a regenerative braking operation priority mode, as can be seen from FIG. 4(a), the wheel brake cylinder pressure is in the form of a reduced value of the static pressure (master cylinder pressure) from the master cylinder connected to the wheel brake cylinder. The reason why the master cylinder pressure is not supplied, as is, to the wheel brake cylinder is that as can be seen from FIG.4(a), until the regenerative braking torque reaches its maximum value or about 0.2 G, no additional braking force is required to the wheel brake cylinder from the master cylinder for being added to the regenerative braking torque. If the master cylinder pressure exceeds 0.2 G due to further brake pedal depression, a real supply of the master cylinder pressure to the wheel brake cylinder begins. The master cylinder pressure supplied to the wheel brake cylinder, which is regulated by a set of a pressure reducing valves, results in a wheel cylinder of FIG. 4(a). FIG. 4(b) represents the relationship between the braking force applied to the wheel and the master cylinder pressure.

Sometimes, a bad braking operation is felt due to an excessive depression of the brake pedal which corresponds to the pressure to be supplied to the wheel brake cylinder. To prevent such a phenomena, when the regenerative braking torque reaches its maximum value, a dynamic hydraulic pressure is supplied to the wheel brake cylinder from a dynamic hydraulic pressure generating device for compensating for the deficient braking force. This supply is established by fluidly isolating the master cylinder from the wheel brake cylinder. The dynamic hydraulic pressure device includes a reservoir storing an amount of brake fluid, a pump and a regulator. The regulator is associated with the master cylinder, thereby constituting a hydraulic-booster as is well known and the brake fluid under pressure fed to the regulator from the reservoir while the pump is being driven is set to be equalized to the master cylinder pressure in response to the brake pedal depression. The resultant dynamic pressure is supplied to the wheel brake cylinder.

As shown in FIG. 5(a), in response to the depression of the brake pedal, the master cylinder pressure increases. On the other hand, as shown in FIG. 5(b), the regenerative braking force depicted in solid line has the maximum value as a limit value and sometimes becomes less than the ideal braking force depicted in dotted line and corresponding to the master cylinder pressure. Thus, when a signal shown in FIG. 5(c) is generated, a valve disposed between the regulator and the wheel brake cylinder is opened for a duration of time to supply the hydraulic pressure to the wheel from the regulator. Thus, as shown in FIG. 5(d), a composition of the regenerative braking force and the resultant hydraulic pressure becomes substantially equal to the ideal or required braking force to be applied to the wheel cylinder.

However, the foregoing supply of the hydraulic pressure to the wheel brake cylinder is established by isolating the master cylinder from the wheel brake cylinder, with the result that despite the driver's depression of the brake pedal little stroke or movement thereof is established. Thus, the driver feels a rigidity in the brake pedal which is a reverse phenomena to the so-called spongy or soft brake feel.

A need therefore exists for a brake control system for an electrically operated vehicle which is free from the foregoing disadvantage and drawback.

It would also be desirable to provide a brake control system for an electrically operated vehicle in which the brake pedal can be depressed without establishing a rigid feeling of the brake pedal.

SUMMARY OF THE INVENTION

In light of the foregoing, one aspect of the present invention relates to a brake control system for controlling a braking force applied to a wheel of an electrically operated vehicle, wherein the brake control system includes an electric motor operatively connected to the wheel for applying a regenerative braking torque to the wheel, a wheel brake cylinder operatively mounted on the wheel for supplying a braking force to the wheel, a static hydraulic pressure generating device for generating a static hydraulic pressure whose magnitude depends on the degree of depression of the brake pedal which is movable between a rest position and a fully depressed position, a dynamic hydraulic pressure generating device for generating a dynamic hydraulic pressure, and a regulating device that substantially equalizes the dynamic hydraulic pressure to the static hydraulic pressure. A static hydraulic pressure supply device adjusts the static hydraulic pressure to a value obtained by subtracting a pressure equivalent to the regenerative braking torque from the static hydraulic pressure and supplies the resultant static hydraulic pressure to the wheel brake cylinder. A dynamic hydraulic pressure supply device supplies the dynamic hydraulic pressure as is to the wheel brake cylinder. A controller controls both the static hydraulic pressure supply device and the dynamic hydraulic pressure supply device so that while the brake pedal is moving from the rest position the wheel brake cylinder is supplied with only the static hydraulic pressure from the static hydraulic pressure supply device and while the brake pedal is retained at a retained position the wheel brake cylinder is supplied with the static hydraulic pressure from the static hydraulic pressure supply device and the dynamic hydraulic pressure from the dynamic hydraulic pressure supply device.

According to another aspect of the invention, a brake control system for controlling a braking force applied to a wheel of an electrically operated vehicle, wherein the brake control system includes an electric motor operatively connected to the wheel for applying a regenerative braking torque to the wheel, and a wheel brake cylinder operatively mounted on the wheel for supplying a braking force to the wheel. A master cylinder is connected to the brake pedal and generates a static hydraulic pressure having a magnitude based on the degree of depression of the brake pedal, with the master cylinder being connected to the wheel brake cylinder for supplying the static hydraulic pressure to the wheel brake cylinder. A dynamic hydraulic pressure generator generates a dynamic hydraulic pressure that is substantially equal to the static hydraulic pressure. A normally closed valve is disposed between the dynamic hydraulic pressure generator and the wheel brake cylinder, and a controller turns on the normally closed valve for a time duration when the brake pedal reaches the fully depressed position.

In accordance with another aspect of the invention, a brake control system for controlling a braking force applied to a wheel of an electrically operated vehicle, wherein the brake control system includes an electric motor operatively connected to the wheel for applying a regenerative braking torque to the wheel, and a wheel brake cylinder operatively mounted on the wheel for supplying a braking force to the wheel. A static hydraulic pressure generator is connected to the wheel brake cylinder for generating a static hydraulic pressure whose magnitude is based on the degree of depression of the brake pedal which is movable between a rest position and a fully depressed position, and a dynamic hydraulic pressure generator is connected to the wheel brake cylinder for generating a dynamic hydraulic pressure. A regulating device generally equalizes the dynamic hydraulic pressure to the static hydraulic pressure, and a controller supplies only the static hydraulic pressure from the static hydraulic pressure generator to the wheel brake cylinder when the brake pedal is moving from the rest position and supplies both the static hydraulic pressure from the static hydraulic pressure generator and the dynamic hydraulic pressure from the dynamic hydraulic pressure generator to the wheel brake cylinder when the brake pedal is retained at a retained position.

BRIEF DESCRIPTION OF THE DRAWING FIGURES

The foregoing and additional features and characteristics of the present invention will become more apparent from the following detailed description considered with reference to the accompanying drawing figures in which like elements are designated by like reference numerals and wherein.

DETAILED DESCRIPTION OF THE INVENTION

Figure 1:
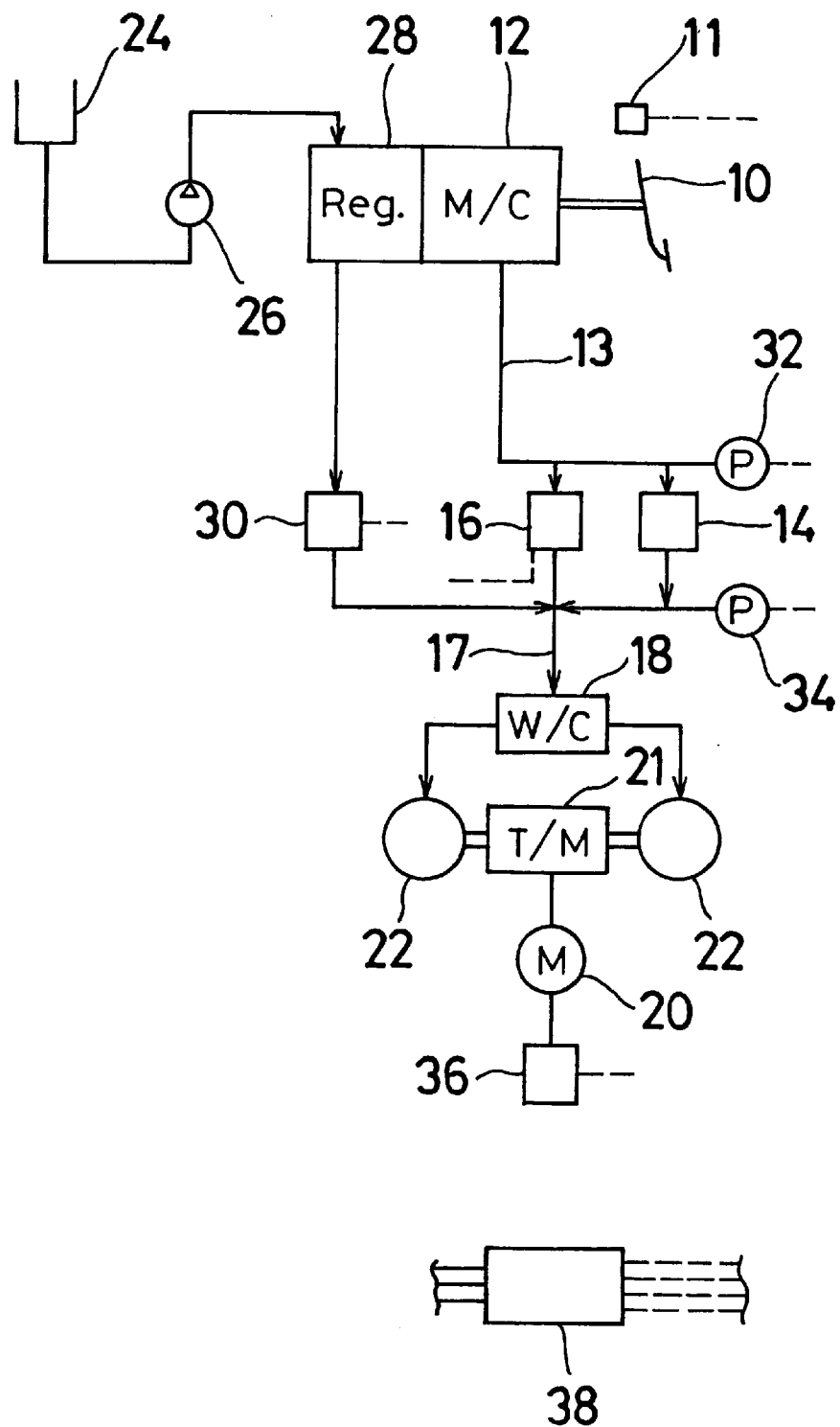
FIG. 1 is a block diagram of a brake control system for an electrically operated vehicle in accordance with an embodiment of the present invention.

Referring initially to FIG. 1, a brake control system for an electrically operated vehicle in accordance with an embodiment of the present invention includes a master cylinder 12 which serves as a static hydraulic pressure generating device. The master cylinder 12 is connected with a brake pedal 10 and is set to generate a static hydraulic pressure whose magnitude varies in response to the depression of the brake pedal 10. The brake pedal 10 is movable between an at rest position and a fully depressed position. A pedal stroke switch 11 is associated with the brake pedal 10 and is closed or turned on whenever the brake pedal 10 at the at rest position is depressed.

The master cylinder 12 is in fluid communication with wheel brake cylinders 18 that are operatively mounted on respective wheels 22. It is to be noted that the illustration of the wheel brake cylinders 18 in FIG. 1 is a schematic illustration of two wheel brake cylinders. The master cylinder 12 is fluidly communicated with the wheel brake cylinders 18 by way of a first conduit 13, a pressure regulating valve 14 and a bypass valve 16 which are arranged in parallel with one another, and a second conduit 17.

An electric motor 20 is connected to both of the wheels 22 via a transmission 21. The electric motor 20 is under the control of a controller 38 which is in the form of a microprocessor or CPU. The controller 38, as is well known, controls the electric motor 20 to apply a rotating force to the wheels 22 and apply a regenerative braking torque to the wheels 22. The regenerative braking force of the electric motor 20 is converted into a corresponding brake pressure by a conversion device 36.

The brake control system also includes a reservoir 24 in which is stored an amount of brake fluid under pressure. The reservoir 24 is connected to a regulator 28 via an electrically operated pump 26. When the pump 26 is operated or driven, the brake fluid in the reservoir 24 which is under pressure is supplied to the regulator 28 which is located adjacent to the master cylinder 12. The resulting brake fluid is adjusted to be substantially equal to the static hydraulic pressure issued from the master cylinder 12. The reservoir 24 and the electrically operated pump 26 constitute or serve as a dynamic pressure generating device.

The regulator 28 is connected to the second conduit 17 via a normally closed valve 30. The valve 30 is adapted to be opened by a valve open signal supplied from the controller 38.

The first conduit 13 is connected to a first pressure gauge 32 and the second conduit 17 is connected to a second pressure gauge 34. The first pressure gauge 32 is adapted to measure or detect the pressure outputted from the master cylinder 12 which is referred to as the master cylinder pressure. The second pressure gauge 34 is adapted to measure or detect the braking force supplied to each of the wheel brake cylinders 18. The braking force supplied to each of the wheel brake cylinders 18 is referred to as the wheel cylinder pressure.

The operation of the brake control system for an electrically operated vehicle of the present invention is as follows. At an initial stage of the brake pedal operation, when the master cylinder pressure is less than the brake pressure Pr converted from the limited maximum regenerative brake force of the electric motor 20 by the conversion device 36, the pressure regulating valve 14, the bypass valve 16 and the valve 30 are all closed so as to apply only the regenerative braking force of the electric motor 20 to the wheels 22 as shown in FIGS. 3(a) and 3(b).

Figure 3:
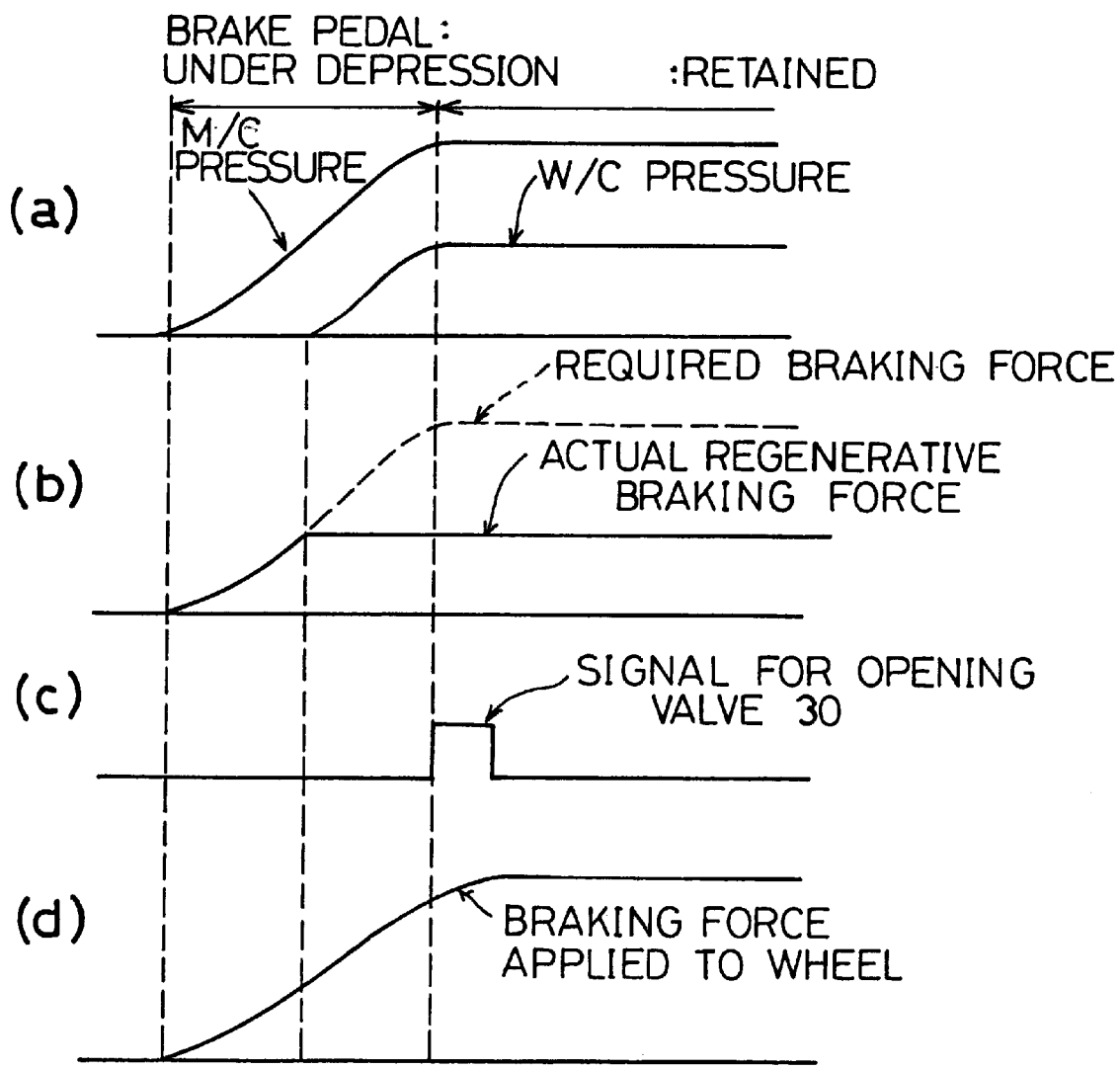
FIG. 3(a) is a graph illustrating the master cylinder pressure and the wheel brake cylinder pressure.
FIG. 3(b) is a graph illustrating the regenerative braking force and the required braking force.
FIG. 3(c) is a graph illustrating the signal for opening a valve for introducing a dynamic hydraulic pressure into the wheel brake cylinder.
FIG. 3(d) is a graph illustrating the braking force applied to the wheel.
Figure 4:
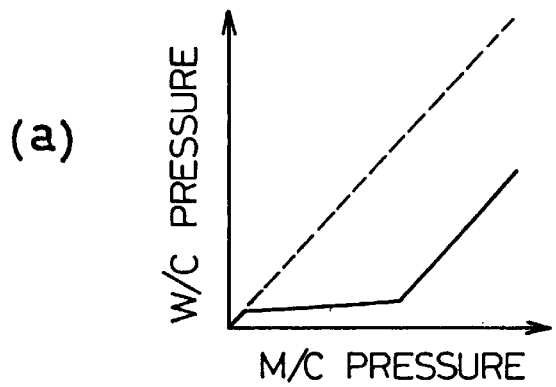
FIG. 4(a) is a graph illustrating the relationship between the master cylinder pressure and the wheel cylinder pressure in a known brake control system.
FIG. 4(b) is a graph illustrating the relationship between the braking force applied to the wheel and the master cylinder pressure in a known brake control system.
Figure 4:
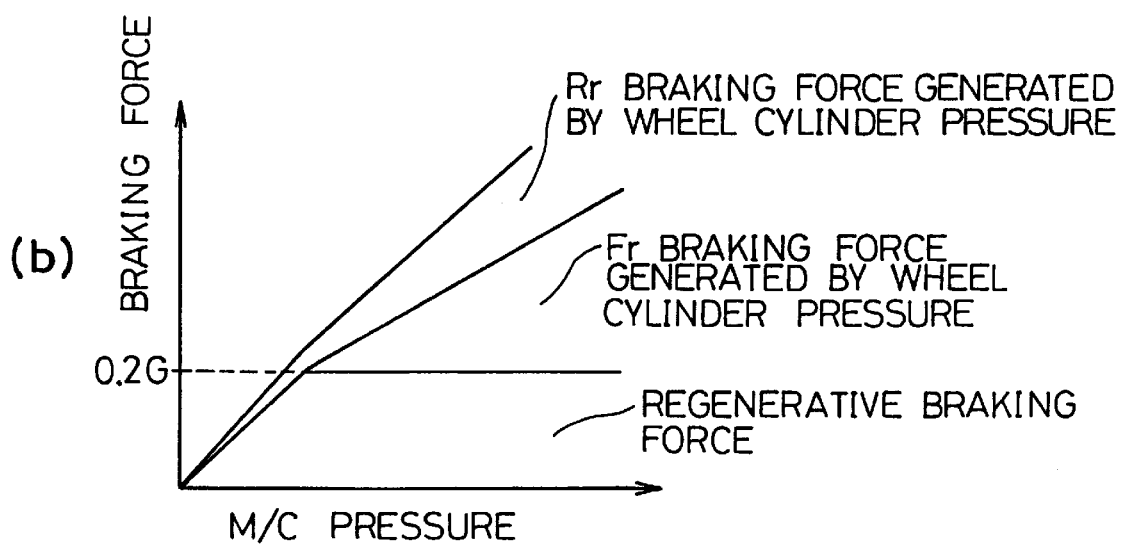
Figure 5:
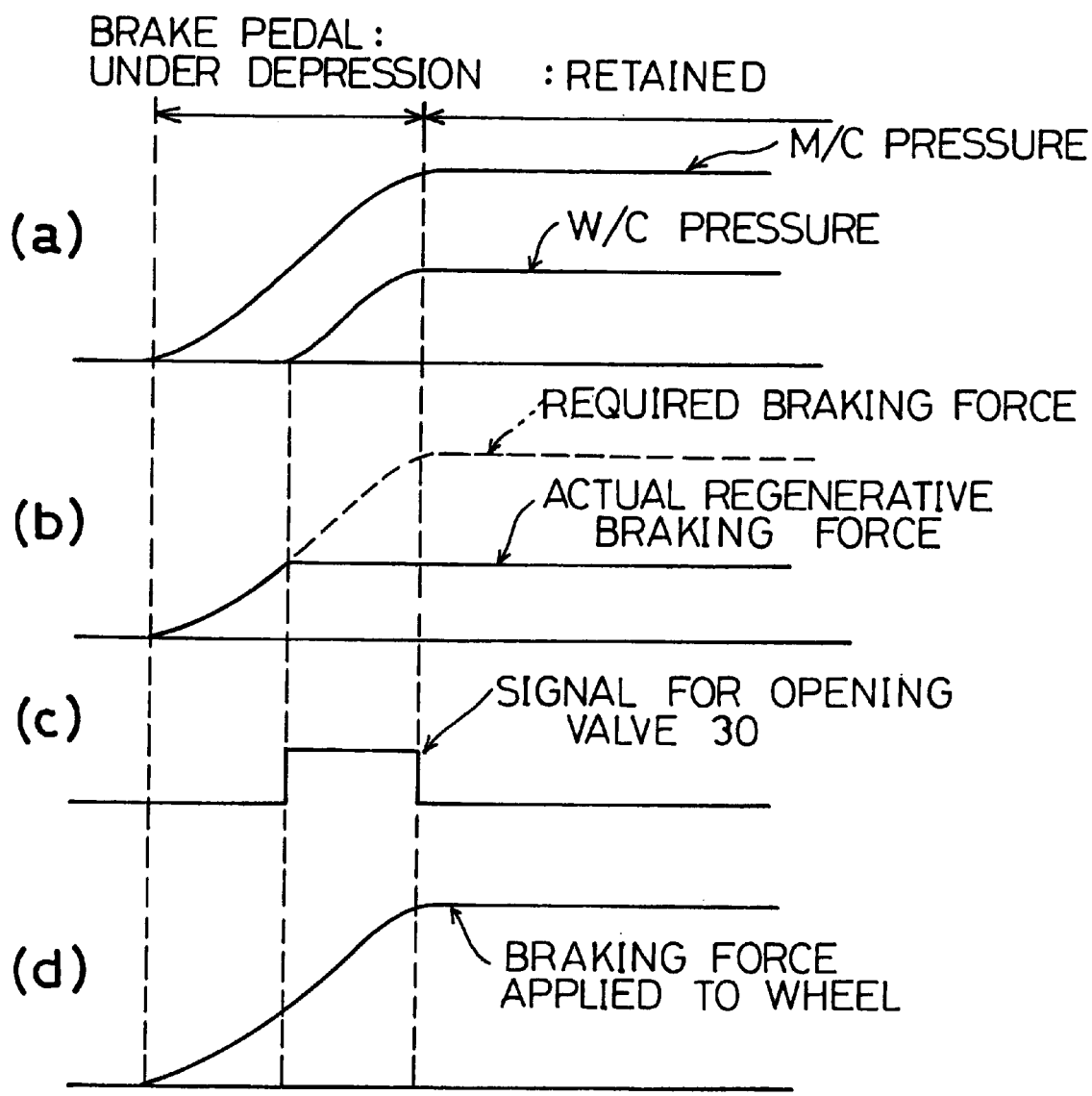
FIG. 5(a) is a graph illustrating the master cylinder pressure and the wheel brake cylinder pressure in a known brake control system.
FIG. 5(b) is a graph illustrating the regenerative braking force and the required braking force in a known brake control system.
FIG. 5(c) is a graph illustrating the signal for opening a valve for introducing dynamic hydraulic pressure into the wheel brake cylinder in a known brake control system.
FIG. 5(d) is a graph illustrating the braking force applied to the wheel, each of which is measured in the conventional brake control system in a known brake control system.

As shown in FIG. 3(a), when the master cylinder pressure reaches the brake pressure Pr converted from the limited maximum regenerative brake force of the electric motor 20 by the conversion device 36, the pressure regulating valve 14 is opened so that the master cylinder pressure is supplied to the wheel brake cylinders 18 so as to generate a predetermined pressure difference value between the master cylinder pressure and the wheel brake cylinder pressure. The pressure regulating valve 14 is designed so as to make the pressure difference value between the master cylinder pressure and the wheel brake cylinder pressure to be equal to the brake pressure Pr converted from the limited maximum regenerative brake force of the electric motor 20 by the conversion device 36. Therefore, the composition of the regenerative brake force of the electric motor 20 and the braking force generated by the wheel brake cylinder pressure corresponds to the required braking force as shown in FIG. 3(d).

Figure 2:
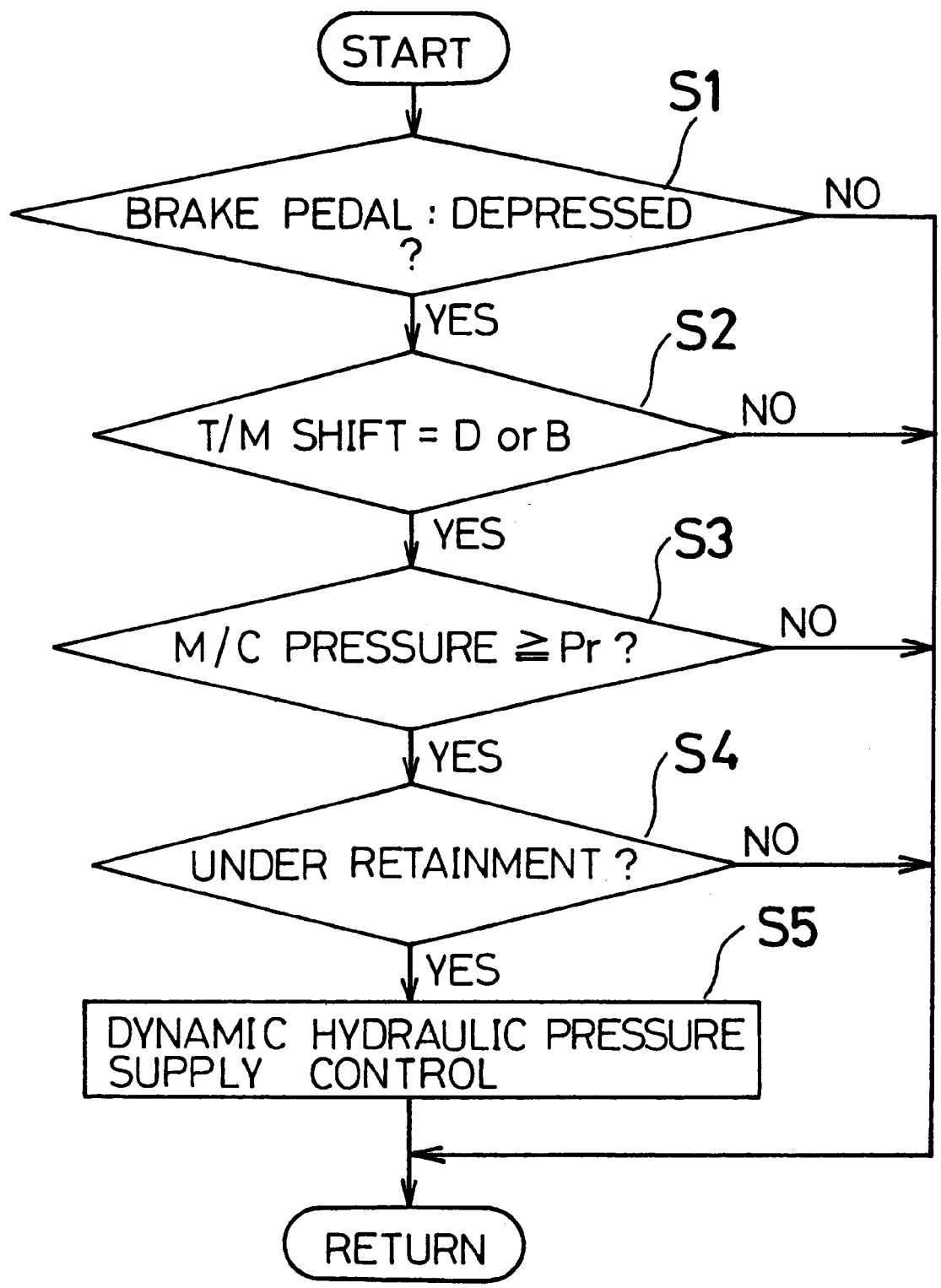
FIG. 2 is a flowchart illustrating a brake control operation in the brake control system shown in FIG. 1.

FIG. 2 illustrates a flow chart depicting the principal operation of the brake control system shown in FIG. 1. At step S1, it is determined whether or not the brake pedal 10 at the rest position is depressed. This movement of the brake pedal 10 from the rest position can be determined by information supplied from the gauge 32 or the pedal stroke switch 11. If the result is yes, step S2 is executed for checking whether or not a shift position of the transmission 21 is in a driving range (D) or a motor braking range (B).

If the result of step S2 is yes, the regenerative braking operation begins. This step is not specifically illustrated in the flow chart of FIG. 2. At step S3, when the master cylinder pressure is detected by the gauge 32 to be larger than the pressure Pr converted from the limited maximum regenerative brake force of the electric motor 20 by the conversion device 36, the program proceeds to step S4. At step S4, when the brake pedal 10 is being depressed or under is under continual depression, thereby increasing the master cylinder pressure in proportion to the degree of depression of the brake pedal 10 detected by the gauge 32, the valve 30 is maintained in the closed condition in order not to supply the dynamic fluid pressure of the regulator 28 to the wheel cylinders 18. As apparent from FIG. 3(a) and FIG. 3(b), at this time, only the master cylinder pressure under increasing is supplied to the wheel brake cylinders 18 through the pressure regulating valve 14.

When the brake pedal 10 is detected to be at the retained position at step S4 by the gauge 32, then at step S5 the valve 30 is opened by a valve opening signal sent from the controller 38 to the valve 30, with the resultant condition lasting for a time duration as shown in FIG. 3(c). As a result, the dynamic fluid pressure from the regulator 28 is supplied to the wheel brake cylinders 18 through the valve 30 in addition to the supply of the master cylinder pressure to the wheel brake cylinders 18 through the pressure regulating valve 14. As previously mentioned, the dynamic hydraulic pressure is regulated at the regulator 28 so as to be equal to the master cylinder pressure. Thus, the braking force applied to each of the wheels 22 follows the graph depicted in 3(d).

The brake control system of the present invention is quite advantageous as compared to other known brake control systems in that the brake pedal can be depressed without the driver obtaining a rigid feeling with respect to the brake pedal.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A brake control system for controlling a braking force applied to a wheel of an electrically operated vehicle that includes a brake pedal, comprising:

an electric motor operatively connected to the wheel for applying a regenerative braking torque to the wheel;

a wheel brake cylinder operatively mounted on the wheel for supplying a braking force to the wheel;

static hydraulic pressure generating means for generating a static hydraulic pressure whose magnitude depends on a degree of depression of the brake pedal which is movable between a rest position and a fully depressed position;

dynamic hydraulic pressure generating means for generating a dynamic hydraulic pressure;

regulating means for substantially equalizing the dynamic hydraulic pressure to the static hydraulic pressure;

static hydraulic pressure supply means for adjusting the static hydraulic pressure to a value obtained by subtracting a pressure equivalent to the regenerative braking torque from the static hydraulic pressure and supplying the resultant static hydraulic pressure to the wheel brake cylinder;

dynamic hydraulic pressure supply means for supplying the dynamic hydraulic pressure as is to the wheel brake cylinder; and control means for controlling both the static hydraulic pressure supply means and the dynamic hydraulic pressure supply means so that while the brake pedal is moving from the rest position the wheel brake cylinder is supplied with only the static hydraulic pressure from the static hydraulic pressure supply means and while the brake pedal is retained at a retained position the wheel brake cylinder is supplied with the static hydraulic pressure from the static hydraulic pressure supply means and the dynamic hydraulic pressure from the dynamic hydraulic pressure supply means.

2. A brake control system as set forth in claim 1, wherein the static hydraulic pressure generating means is a master cylinder.

3. A brake control system as set forth in claim 1, wherein the dynamic hydraulic pressure generating means includes a reservoir in which an amount of brake fluid is stored and an electrically operated pump.

4. A brake control system as set forth in claim 3, wherein the static hydraulic pressure generating means is a master cylinder.

5. A brake control system as set forth in claim 1, including a normally closed valve disposed between the dynamic pressure generating means and the wheel brake cylinder.

6. A brake control system for controlling a braking force applied to a wheel of an electrically operated vehicle that includes a brake pedal, comprising:

an electric motor operatively connected to the wheel for applying a regenerative braking torque to the wheel;

a wheel brake cylinder operatively mounted on the wheel for supplying a braking force to the wheel;

a master cylinder connected to the brake pedal and generating a static hydraulic pressure having a magnitude based on a degree of depression of the brake pedal, the master cylinder being connected to the wheel brake cylinder for continually supplying the static hydraulic pressure to the wheel brake cylinder;

a dynamic hydraulic pressure generator for generating a dynamic hydraulic pressure that is substantially equal to the static hydraulic pressure;

a normally closed valve disposed between the dynamic hydraulic pressure generator and the wheel brake cylinder; and a controller turning on the normally closed valve for a time duration when the brake pedal reaches a fully depressed position.

7. A brake control system as set forth in claim 6, wherein the dynamic hydraulic pressure generator includes a reservoir for storing an amount of brake fluid and an electrically operated pump.

8. A brake control system as set forth in claim 6, including a normally closed valve positioned between the master cylinder and the wheel brake.

9. A brake control system as set forth in claim 8, including a pressure measure device located between the master cylinder and the normally closed valve.

10. A brake control system for controlling a braking force applied to a wheel of an electrically operated vehicle that includes a brake pedal, comprising:

an electric motor operatively connected to the wheel for applying a regenerative braking torque to the wheel;

a wheel brake cylinder operatively mounted on the wheel for supplying a braking force to the wheel;

a static hydraulic pressure generator connected to the wheel brake cylinder for generating a static hydraulic pressure whose magnitude is based on a degree of depression of the brake pedal which is movable between a rest position and a fully depressed position;

a dynamic hydraulic pressure generator connected to the wheel brake cylinder for generating a dynamic hydraulic pressure;

regulating means for substantially equalizing the dynamic hydraulic pressure to the static hydraulic pressure; and means for supplying only the static hydraulic pressure from the static hydraulic pressure generator to wheel brake cylinder when the brake pedal is moving from the rest position and for supplying both the static hydraulic pressure from the static hydraulic pressure generator and the dynamic hydraulic pressure from the dynamic hydraulic pressure generator to the wheel brake cylinder when the brake pedal is retained at a retained position.

11. A brake control system as set forth in claim 10, wherein the static hydraulic pressure generator is a master cylinder.

12. A brake control system as set forth in claim 10, wherein the dynamic hydraulic pressure generator includes a reservoir in which an amount of brake fluid is stored and an electrically operated pump.

13. A brake control system as set forth in claim 10, including a normally closed valve disposed between the dynamic pressure generator and the wheel brake cylinder.

14. A brake control system as set forth in claim 10, including a normally closed valve positioned between the static hydraulic pressure generator and the wheel brake.

15. A brake control system as set forth in claim 14, including a pressure measure device located between the static hydraulic pressure generator and the normally closed valve.

* * * * *